United States Patent [19]

Komoda et al.

[11] Patent Number: 4,788,892
[45] Date of Patent: Dec. 6, 1988

[54] CONTROLLER FOR AUTOMATIC TRANSMISSION

[75] Inventors: Norio Komoda, Nagoya; Atsumu Otobe, Toyota, both of Japan

[73] Assignee: Toyota Jidosha Kabushiki Kaisha, Aichi, Japan

[21] Appl. No.: 861,856

[22] Filed: May 12, 1986

[30] Foreign Application Priority Data

May 11, 1985 [JP] Japan .................................. 60-100150
Jun. 26, 1985 [JP] Japan .................................. 60-142095

[51] Int. Cl.$^4$ ............................................. B60K 41/06
[52] U.S. Cl. .......................................... 74/866; 74/844; 74/878
[58] Field of Search ............... 74/844, 862, 865, 866, 74/878; 180/70.1, 170, 171, 172, 174; 364/424.1

[56] References Cited

U.S. PATENT DOCUMENTS

| | | | |
|---|---|---|---|
| 3,732,755 | 5/1973 | Beig et al. | 74/866 |
| 4,363,973 | 12/1982 | Kawata et al. | 180/170 X |
| 4,445,329 | 5/1984 | Drisko | 180/170 X |
| 4,497,223 | 2/1985 | Maruyama et al. | 74/866 |
| 4,519,274 | 5/1985 | Maruyama et al. | 74/714 X |
| 4,519,275 | 5/1985 | Maruyama et al. | 74/866 |
| 4,566,709 | 1/1986 | Sano | 180/170 X |
| 4,670,845 | 6/1987 | Etoh | 180/170 X |
| 4,679,145 | 7/1987 | Beeck et al. | 74/866 X |
| 4,692,866 | 9/1987 | Kosuge | 74/866 X |

FOREIGN PATENT DOCUMENTS

| | | | |
|---|---|---|---|
| 0021049 | 2/1983 | Japan | 74/844 |
| 0151655 | 8/1984 | Japan | 74/878 |

Primary Examiner—Allan D. Herrmann
Assistant Examiner—David Novaia
Attorney, Agent, or Firm—Parkhurst, Oliff & Berridge

[57] ABSTRACT

A controller for an automatic transmission includes a sensor for detecting a vehicle operating condition, a transmission for changing a rotational ratio of drive and driven shaft, and an ordering mechanism for ordering shift change to drive the transmission based on the operating condition detected by the sensor. Also provided are a cornering mechanism for detecting vehicle cornering, an accelerating detection mechanism for detecting vehicle acceleration, and an inhibiting mechanism for inhibiting shift down to lower the rotational ratio of drive and driven shaft in the transmission by the controller in case both vehicle cornering detected by the cornering mechanism and vehicle acceleration detected by the accelerating detection mechanism are equal to or greater than the first and second preset values, respectively.

10 Claims, 13 Drawing Sheets

CONTROLLER FOR AUTOMATIC TRANSMISSION

BACKGROUND OF THE INVENTION

1. Technical Field

This invention relates to a control system for an automatic transmission applied to a vehicle, in particular, for controlling a driving force during cornering.

2. Prior Art

Various types of automatic transmissions have been offered to replace manual transmissions and automatically perform complicated operations of gear changes. The automatic transmission automatically operates the gear changes responsive to vehicle speed and accelerator opening. Judging to accelerate by large throttle valve opening, the automatic transmission operates to shift down to the forceful speed so that the rotational ratio of a drive and driven shaft is varied, while judging not to accelerate by small throttle valve opening due to release of the accelerator pedal, the automatic transmission operates to shift up to the forceless speed. However, the above conventional automatic transmissions equipped on vehicles are not sufficient, having problems as described below.

Upon passing through a curve safe and fast, a driver in the straight course slows down just before the curve based on the principle of slow-in fast-out, and then accelerates around the corner. With the aforementioned condition, the automatic transmission is automatically shifted down to the forceful speed to increase the driving force sharply, which results in deterioration of the cornering force for stable running, a decrease cornering in power of driving wheel, and may cause spin out in FR vehicles and drift out in FF vehicles due to wheel spin by decreased inner wheel load during cornering. Therefore, the above automatic transmission has a serious problem such as lack of safety. This problem is mostly found in recent high power engines which tend to generate too much driving force.

SUMMARY OF THE INVENTION

It is an object of the invention to provide a superior controller for an automotive transmission which avoids vehicle spin and provides a quick cornering without generating too much driving force in spite of over acceleration in the curve with its angle exceeding a preset degree.

It is a further object of the invention to provide a controller for an automatic transmission which avoids generation of too much driving force during cornering without shifting down in spite of over acceleration in the curve with its angle exceeding a preset degree, thereby avoiding vehicle spin during cornering and providing a safe and quick cornering.

It is another object of the invention to provide a controller for an automatic transmission which is effective for recent high power engines which tend to generate too much driving force.

It is an additional object of the invention to provide a controller for an automatic transmission in which the gear is automatically shifted to a desirable position to provide a fast and safe running since the holding of the above shift down is released in case the acceleration decreases to below a preset value during or after cornering.

It is another object of the invention to provide a controller for automatic transmission which avoids causing too much driving force by releasing the holding of shifting down only when the acceleration is desired to be further increased and provides stable and comfortable running without abrupt and uncomfortable shift down.

To solve the aforementioned problem, as shown in the block diagram of FIG. 1, the invention comprises an operating condition detection means M1 for detecting the operating condition of vehicles, a gear change means M2 for changing rotational ratio of the driven and drive shaft, and an order means M3 for ordering a change of gear to operate above gear change means M2 based on operating conditions detected by the above operating condition detection means M1. The present invention further comprises a cornering detection means M4 for detecting vehicle cornering, an acceleration or throttle valve opening degree detection means M5 for detecting vehicle acceleration or the degree of throttle valve opening, and an inhibit means M6 for inhibiting the order of shifting down by the order means deteriorating the rotational ratio of the driven and drive shaft in above gear change means in case the vehicle cornering degree detected by the cornering detection means M4 and the vehicle acceleration or the degree of throttle valve opening detected by the acceleration or throttle valve opening degree detection means M5 are preset values or more.

The operating condition detection means M1 detects main factors such as the running vehicle speed or the throttle position, permitting to select the optimum gear of the automatic transmission. To detect the running vehicle speed, a wheel sensor for detecting rotational speed of the wheel is used. To detect the throttle opening, an accelerator pedal sensor for detecting displacement degree of the accelerator pedal or a throttle valve opening sensor for detecting throttle valve opening installed in an intake pipe or the like are used.

The gear change means M2 varies the rotational ratio of drive and driven shafts by changing gear for controlling both driving force and gear speed of the vehicle. Recent automatic transmission employs the combination of torque converter and reduction gear of a planetary gear type.

The order means M3 orders the above gear change means to change gear based on the information from the above operating condition detection means M1 so that optimum shifting for the respective operating condition is selected. The order means M3 applies hydraulic pressure or the control valve electrically operated or the like.

The cornering detection means M4 detects the degree of a vehicle cornering using as follows:

(1) a sensor for detecting rotational degree of a steering wheel operated by a driver;

(2) a sensor for detecting balance of rotation speed between a left and a right wheel during cornering;

(3) a sensor for detecting balance of displacements between a left suspension and a right suspension caused by the rolling of the vehicle body during cornering; and (4) a sensor for detecting inertia in a transverse direction of a vehicle during cornering.

The acceleration detection means M5 detects vehicle acceleration, using as follows:

(1) a sensor for detecting displacement degree of the accelerator pedal;

(2) a sensor for detecting degree of the throttle valve position;

(3) a sensor for detecting change ratio of a vehicle wheel rotational speed to preset time;

(4) a sensor for detecting balance of displacements between a front and rear suspension; and (5) a sensor for detecting inertia during vehicle acceleration.

The inhibit means M6 has a function for judging whether or not the abrupt change in torque due to shift down or the accompanying vehicle wheel again spin occurs. The above means has another function for holding the shift to prevent the shift down when the occurrence of vehicle wheel spin is predicted. In case both the cornering degree detected by the above cornering detection means and the degree of throttle valve opening by the above acceleration detection means exceed preset values, the former function of the above means judges the abrupt change in torque due to shift down or the accompanying vehicle spin, which may be judged responsive to the vehicle speed and/or the road surface condition for obtaining more accurate condition. The latter function of the above means generates an inhibit signal for preventing a gear change signal output from the above order means M3 to the gear change means M2 from directly operating even if the gear change signal is input. In the above-constructed controller for automatic transmission, in case both the cornering angle detected by the cornering detection means M4 and the degree of throttle valve opening detected by the acceleration detection means M5 exceed preset values, the inhibit means M6 orders the order means to prevent the gear change means from automatically shifting down even if the vehicle spin is judged to occur, resulting to avoid abrupt and too much driving force and wheel spin without deteriorating the limitation of cornering force for safe running.

The detailed description will be explained as below in reference to the embodiments.

DETAILED DESCRIPTION OF PREFERRED EMBODIMENTS

The first embodiment in the present invention is described based on FIGS. 2 thru 6.

Figure 1:
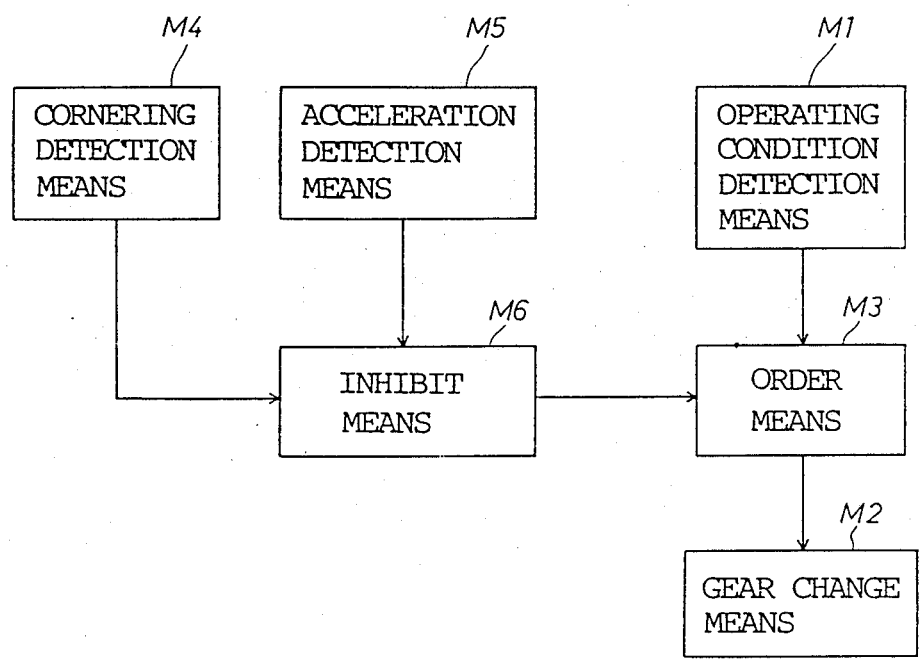
FIG. 1 is a block diagram illustrating construction of the present invention.
Figure 2:
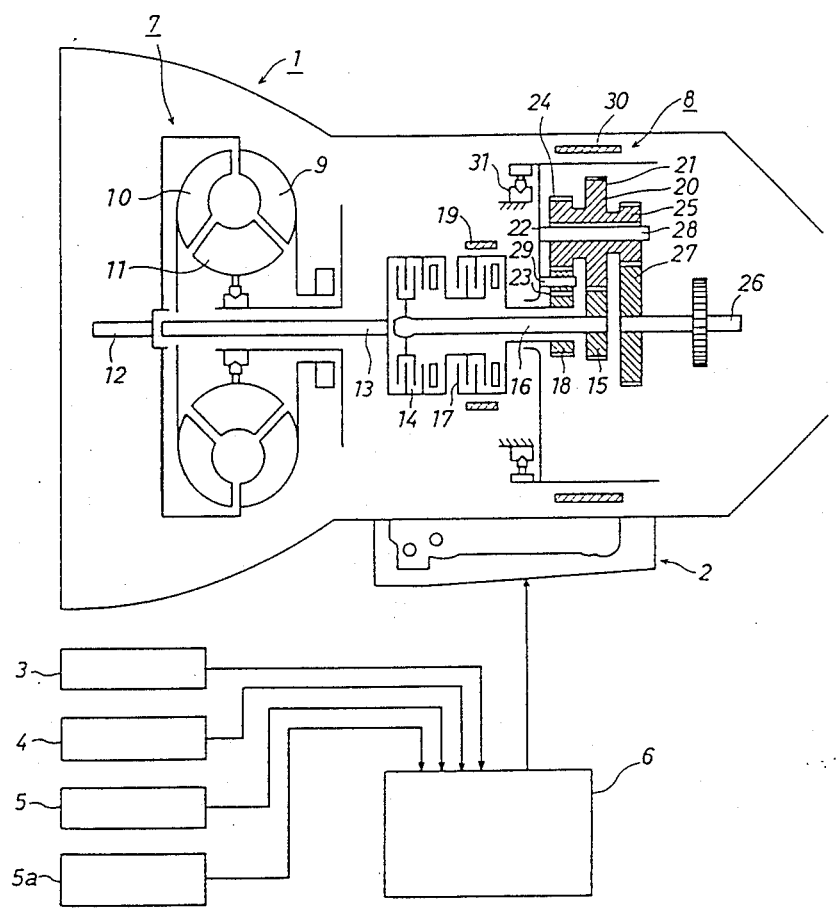
FIG. 2 is a schematic view illustrating the whole construction of the present invention.

FIG. 2 is a schematic view illustrating the whole construction of the first embodiment of the present invention. The embodiment will be explained with an example of FR vehicle with electronic controlled automatic transmission. Numeral 1 shows a body of transmission. Numeral 2 shows a hydraulic control part, numeral 3 shows a vehicle speed sensor, and numeral 4 shows a throttle sensor. Numeral 5 shows a steering angle sensor, and numeral 5a shows a shift position switch. Numeral 6 shows an electronic control part.

Figure 3:
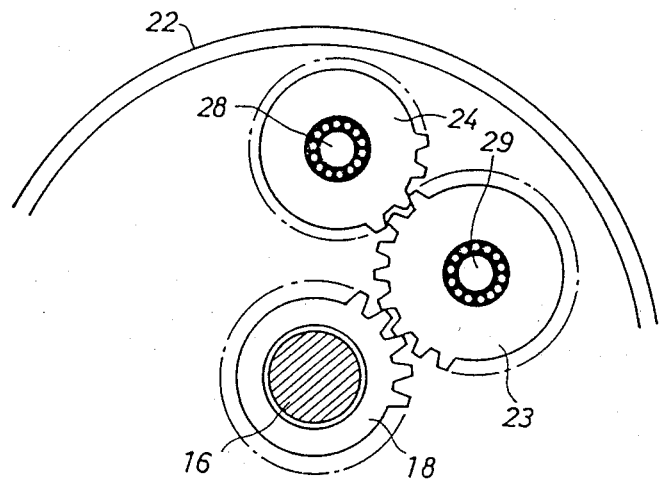
FIG. 3 is a sectional view of the main part of planetary gear system.

The transmission 1 consists of a torque converter 7 and a planetary transmission 8 with three front speeds and one reverse speed. The torque converter 7 is well-known for consisting of a pump blade 9, a turbine blade 10 and a stator 11, in which the pump blade 9 and the turbine blade 10 are connected to a crank shaft 12 and a turbine shaft 13 respectively to input rotational power to the planetary transmission 8. The planetary transmission 8 comprises two multiple disc clutch engaged with each other by a hydraulic servo mechanism, two hydraulic brake bands, a one-way clutch, and a planetary gear with a sun gear and a pinion gear. FIGS. 2 and 3 illustrate the sectional view of the main part of the planetary gear. The turbine shaft 13 is connected to a middle shaft 16 with an input sun gear 15 by a front clutch 14 and linked to a reverse sun gear 18 by a rear clutch 17. A brake and apparatus (hereinafter referred a front brake band 19) is applied to the outer periphery of the rear clutch 17 for controlling a reverse sun gear 18 and operated by an oil servo. The input sun gear 15 is engaged with a gear 21 of a pinion gear 20 arranged in appropriate numbers (for example, two or three couples) on the periphery. The reverse sun gear 18 is engaged with an idler gear 23 on a carrier 22, wherein the gear 24 of the pinion gear 20 is engaged in the idler gear 23. A gear 25 at the end of the pinion gear 20 is engaged in a gear 27 of an output shaft 26 in the transmission. The pinion gear 20 and the idler gear 23 are held on the carrier 22 by a pinion pin 28 and 29, wherein the carrier 22 with a brake band (hereinafter referred as a rear brake band 30) for controlling is operated by the oil servo. The carrier 22 applies an one-way clutch 31 which fixes the carrier 22 to rotational direction.

The operating condition of the transmission obtained with the above construction is described.

The front clutch 14 and the rear brake band 30 are operated through the first speed. (In case of being driven from an engine, the rear brake band 30 is not necessary to be operated since the one-way clutch 31 is operated, however, the power generated from the output shaft 26 is not transmitted.) The rotation of the turbine shaft 13 is transmitted to the input sun gear 15. The pinion pin 28 is fixed since the carrier 22 is also fixed by the rear brake band 30. The input rotation is transmitted to the gear 27 in the output shaft via the input sun gear 15, the gears 21 and 25 with reduced speed.

The front clutch 14 and the front brake band 19 are operated through the second speed. The input sun gear 15 creates inputting, while the reverse sun gear becomes static because the rear clutch 17 is fixed by the front brake band 19. The rotation of the input sun gear 15 rotates the carrier 22 by the counter force of the reverse sun gear 18 in the same direction as the gear 15 to transmit the rotation with deceleration to the gear 27 in the output shaft 26.

The front clutch 14 and the rear clutch 17 are operated through the third speed. The rotation of the planetary gears drive the turbine shaft 13 and the output shaft 26 since input is executed by both the sun gear 15 and the reverse sun gear 18.

The rear clutch 17 and the rear brake band 30 are operated by reverse. The pinion pins 29 and 28 are fixed in accordance with the carrier 22. The input from the turbine shaft 13 is transmitted to the gear 27 of the output shaft 28 via the gears 24 and 25 in the pinion gear 20 to reverse the output shaft 26.

The hydraulic control portion 2 comprises a well-known hydraulic control circuit having a 1-2 shift solenoid operating first to second or second to first speed and a 2-3 shift solenoid operating second to third and third to second speed, mainly utilizing oil pressure from the oil pump to adjust and change the oil pressure from the oil pump to adjust and change the oil pressure of an operation line such as the front clutch 14, the rear clutch 17, the front brake band 19 and the rear brake band 30.

The energized conditions of the above two shift solenoids and the operating conditions of the front clutch 14, the rear clutch 17, the front brake band 19, the rear brake band 30 and the one-way clutch 31 are shown in Table 1 along with the relation between the operating position of a shift position switch 45a and the gear position of the running vehicle.

In Table 1, ON and OFF stand for the energized and deenergized states, respectively, and/or stands for being selected the gear position either in energized or deenergized condition. In the oil servo operation, o and x respectively stand for operative and non-operative conditions. During engine operation in the first speed with a position of L, when the power is transmitted from the engine to the output shaft in the transmission, the one-way clutch is operated.

The shift position switch 5a standing for the shift lever position sets four drive conditions as neutral, reverse, forward and the first gear front, respectively designated as N,R,D, and L.

Figure 4:
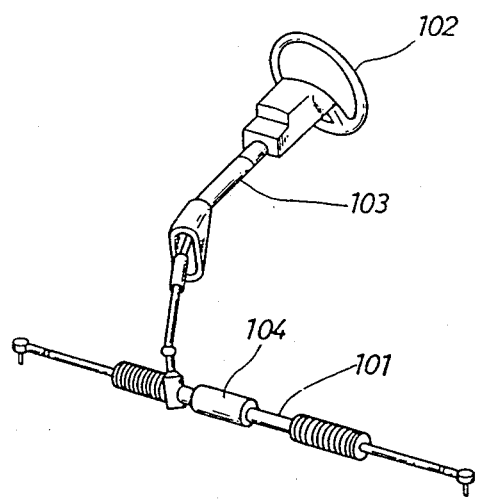
FIG. 4 is an explanatory view illustrating a steering angle sensor.

The vehicle speed sensor 3 is a well-known rotating sensor or generator obtaining alternate voltage with proportional frequency to the vehicle speed by use of permanent magnetic coil. The throttle sensor 4 is well-known for outputting the signal voltage responsive to the throttle valve opening. The steering angle sensor 5 for detecting steering angle is installed in a steering gear box 101 as shown in FIG. 4 and constructed so as to electrically detect engaging position of gears as a steering angle by using potentiometer. In FIG. 4, 102 and 103 designate a steering wheel and a steering column, respectively. Since the steering angle sensor 104 can detect the steering angle from the rotational degree of the steering wheel by the driver, which may be installed in the steering column 103 to detect the rotational degree of the steering column 103 to detect the rotational degree of the steering shaft fixed to the steering column 103 by such methods applying photoelectric converter, electromagnetic pick up and contact.

Figure 5:
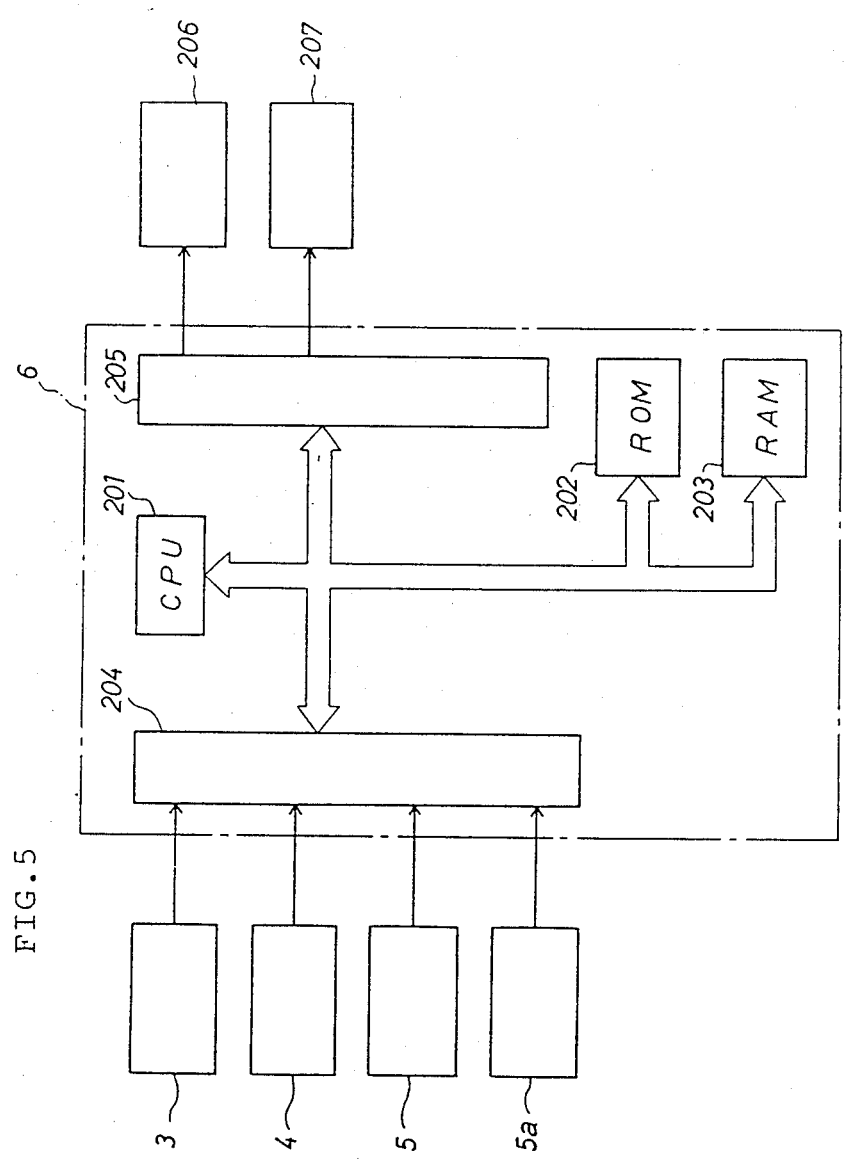
FIG. 5 is a block diagram of an electronic control part 6 and its related part.

FIG. 5 is a block diagram illustrating the electronic control portion 6 and its related portions. A central processing unit (CPU) 201 controls various instruments along with calculating and inputting the data output from sensors such as the vehicle speed sensor 3, the throttle sensor 4, the steering angle 5 and the position switch 5a. A read only memory (ROM) 202 stores control program and initial data. A random access memory (RAM) 203 temporarily reads and writes such data input to the electronic control portion 8 required for calculating and controlling. An input portion 204 includes an input port which is not shown in a figure, a wave shape forming circuit installed in case of necessity, a multiplexer which selectively generates an output signal from each sensor to the CPU 201, and A/D converter which converts analog digital signal. An output portion 205 consists of an output port and an amplifier circuit which amplifies enough voltage to drive the 1-2 shift solenoid 206 or the 2-3 shift solenoid 207 in case of necessity.

TABLE 1

| Shift Position Switch | 1-2 Solenoid | 2-3 Solenoid | Front Clutch | Rear Clutch | Front Brake Band | Rear Brake Band | One-Way Clutch |
|---|---|---|---|---|---|---|---|
| D 1st speed | ON | ON | o | x | x | x | x |
| 2nd speed | OFF | ON | o | x | o | x | x |
| 3rd speed | OFF | OFF | o | o | x | x | x |
| L 1st speed | — | — | o | x | x | o | (o) |
| N | — | — | x | x | x | x | x |
| R | — | — | x | o | x | o | x |

Figure 6:
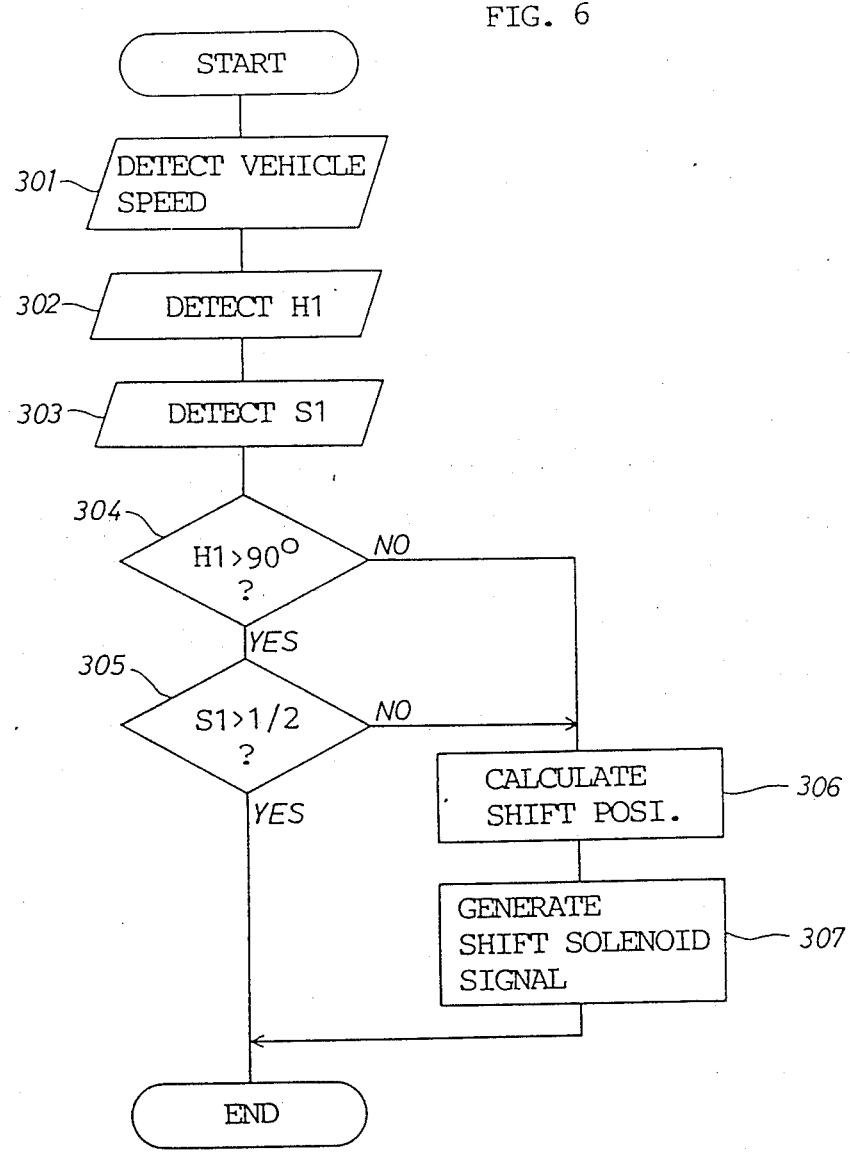
FIG. 6 is a flow chart illustrating the inhibition of gear change of the automatic transmission in the first embodiment.

A control routine of the automatic transmission by the electronic controller for automatic transmission is described in detail with reference to a flow chart in FIG. 6. The routine only shows the control procedure of the CPU in which the shift position switch 5a is in D range. The routine with the shift position switch in other ranges is well-known enough to be omitted. The routine proceeds without interruption to the CPU 201 at a preset time interval during vehicle running. In starting, step 301 is executed, wherein a vehicle speed is detected by the vehicle speed sensor 3. The program proceeds to step 302 wherein a degree of cornering by the steering angle sensor 5 is detected to obtain steering angle H1. Step 303 detects vehicle acceleration by the output from the throttle sensor 4, by which the throttle position S1 is detected.

The program proceeds to step 304 wherein the steering angle H1 detected at step 302 is judged whether it is more than 90°. When the steering angle H1 is judged to be more than 90° in the step 304, the program proceeds to step 305 wherein the throttle position S1 detected by the above step 303 is judged to be more than half (½) of full throttle position. When the throttle opening S1 is judged to be more than half (½) in step 405, the program is terminated. In case the steering angle is judged to be 90° or less at step 304, or the throttle position S1 is judged to be half (½) of full throttle position or less at step 305, the program proceeds to step 306 wherein the shift position providing the vehicle speed V detected at the above step 301, the throttle position S1 detected at step 303, optimum speed, and driving force. The program proceeds to step 307 wherein the signal is generated, which energizes either 1-2 shift solenoid 205 or 2-3 shift solenoid 207 to change gear to the shift position calculated by the step 306. Then the program is terminated. The procedures at both step 306 and step 307 are skipped which executes the procedures of the inhibit means M6.

Aforementioned controller for automatic transmission of the present embodiment avoids shift changing in case both steering angle and degree of the throttle position are above 90° and half ($\frac{1}{2}$) of full throttle position, resulting in safe running without applying too much driving force during cornering nor deteriorating limitation of the cornering force. A passenger car with this controller, in particular, easily corners and accelerates with normal speed on general road surface with safety.

The second embodiment of the present invention is described in reference to FIGS. 7-10.

Figure 7:
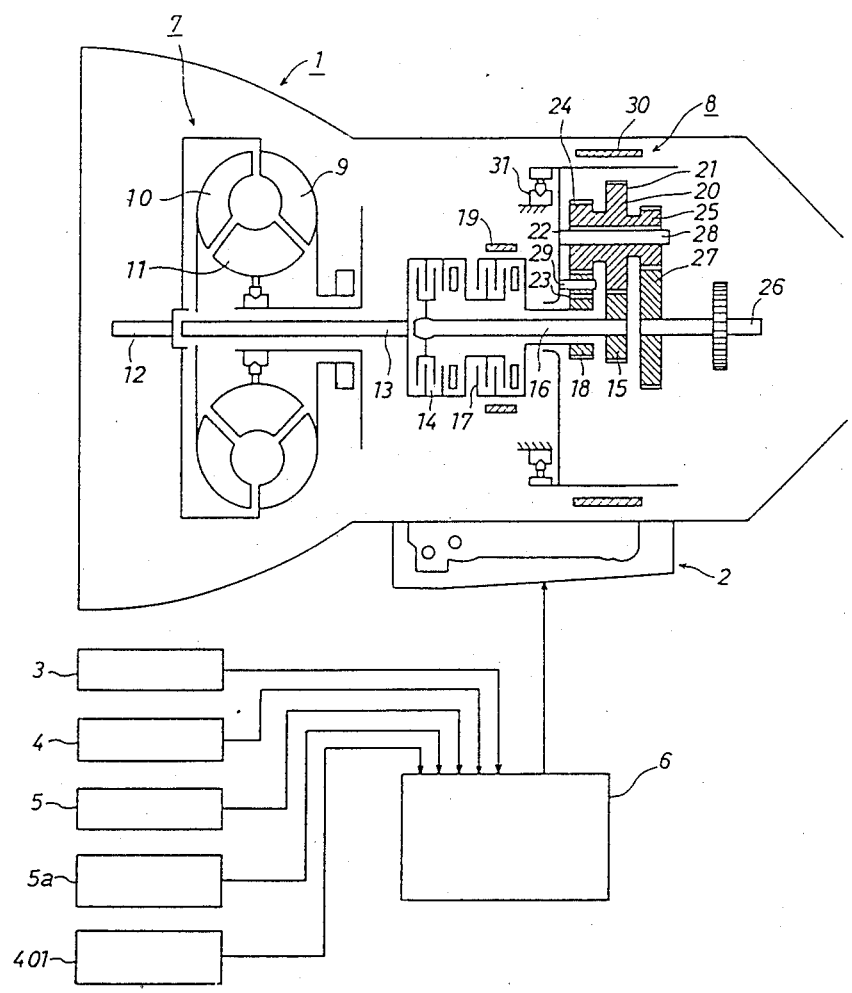
FIG. 7 is a schematic view illustrating the whole construction in the second embodiment.
Figure 8:
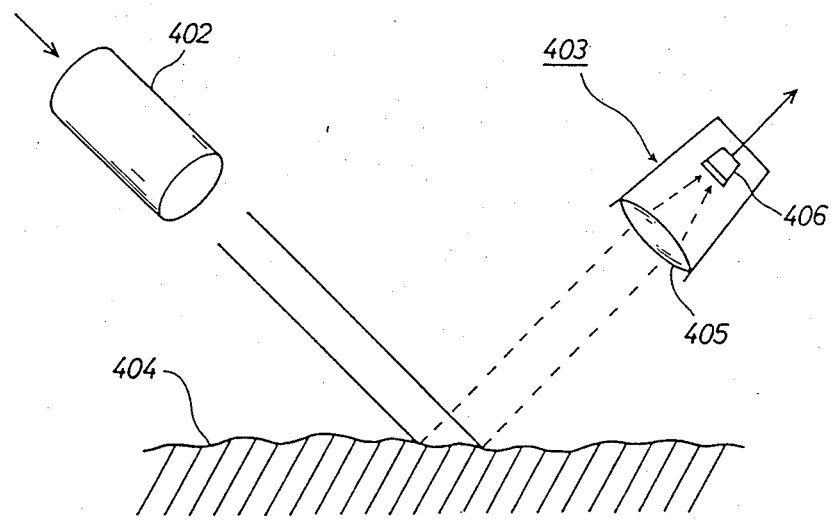
FIG. 8 is an explanatory view showing a humidity road surface sensor.

FIG. 7 illustrates a view of the whole construction of the second embodiment of the present invention in which a humidity sensor 401 is added to the construction of the first embodiment. The humidity sensor 401 includes various detectors or combinations thereof for detecting whether the road surface is paved, or a water screen is formed thereon, by which a slippery condition of the road surface is detected.

The sensor 401 consists of a light emitter 402 with built-in photo diode and light receiving portion 403 which is previously installed to he position where the emitted light from the light emitter reaches in mirror reflection. In the case the photo diode emits the light with specific wave length in accordance with the photo signal generated to the light emitter 402, the light amount reaching to a condensing lens 405 in the light receiving portion 403 increases to indicate the road surface 404 shows almost the same property as that of a mirror surface. The specular condition of the road surface is approximately proportional to the output of the light receiving portion 403 showing that water screen formed on the road surface 404 increases the output W of the humidity sensor of road surface, thus detecting the road surface condition.

The electronic control portion and its related portion in the present embodiment are approximately the same as those of the first embodiment referred to FIG. 5, however, the signals of the vehicle speed sensor 3, throttle sensor 4 and the steering angle sensor 5 of the first embodiment are input to the input portion 204 along with the signal of the above humidity sensor of road surface 401.

Figure 9:
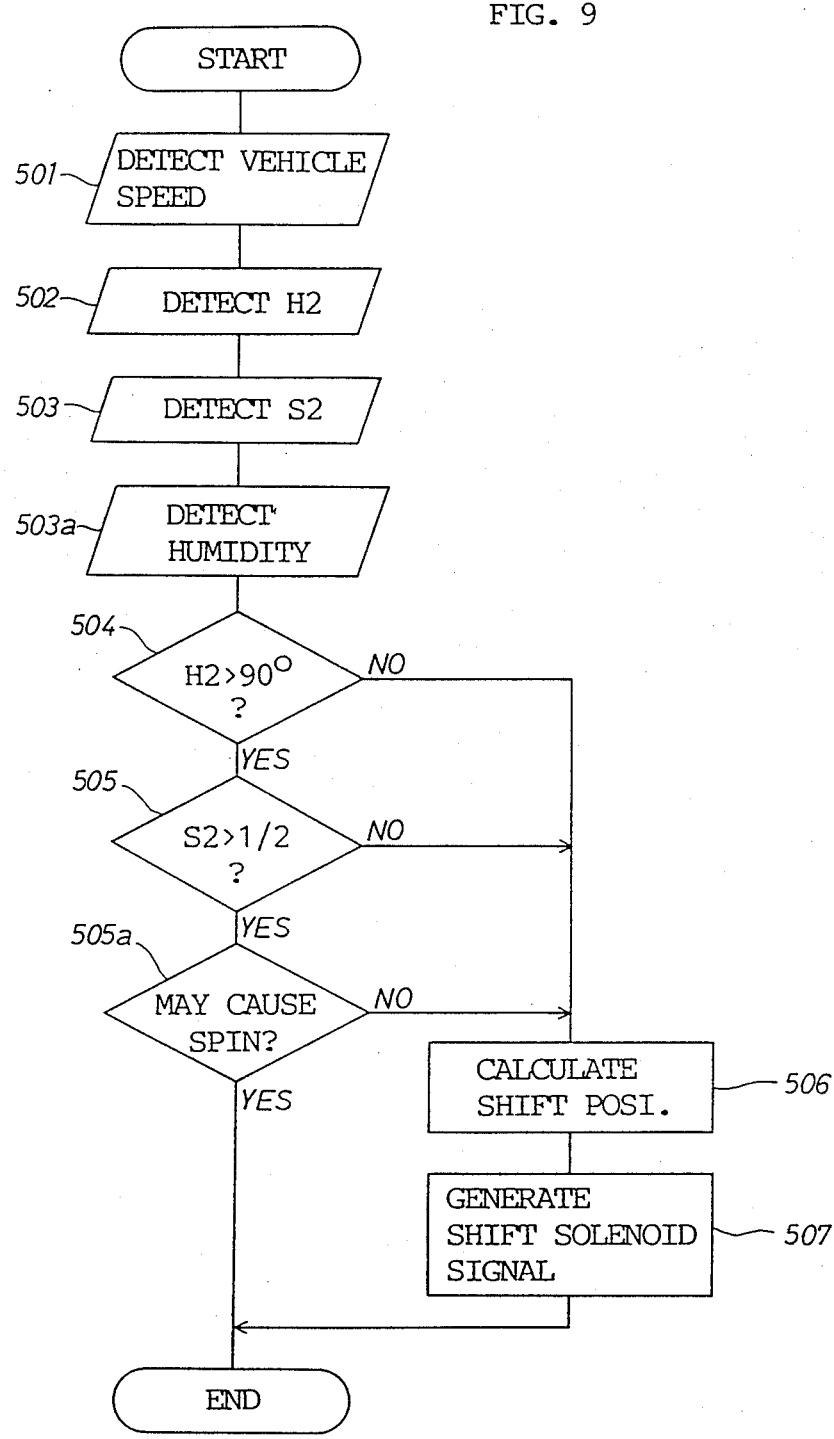
FIG. 9 is a flow chart illustrating inhibition of automatic transmission in the present embodiment.
Figure 10:
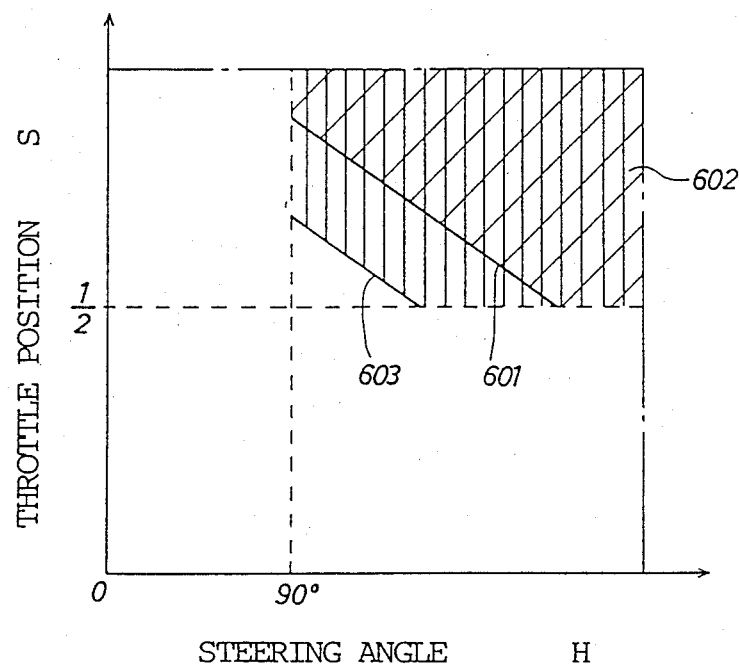
FIG. 10 is a table showing the region of the vehicle spin.

The above-constructed control routine of the automatic transmission by the electronic control portion in the second embodiment is described in detail in reference to a flow chart of FIG. 9. The present embodiment, as well as the first embodiment only describes the routine executed by the CPU only when the shift position switch 5a is within D range, since the routine with the switch within other ranges is well known enough to be omitted. The routine proceeds with interruption to the CPU at a preset time interval during vehicle running.

When starting the program, step 501 is executed. Since the steps from 501 to 503, 504 to 505, and 506 to 507 correspond to the steps from 301 to 303, 304 to 305 and 306 to 307, respectively, as shown in the first embodiment their explanations are omitted. Subsequent to the step 501, step 502 and 503 are executed to proceed to step 503a wherein the present condition of the road surface is detected by output W of the light receiving portion 406 in the humidity sensor 401.

Next, the judgment at steps 504, 505 and 505a are executed. At step 505a, the possibility of vehicle spin is judged by the vehicle speed V detected by the above step 501 and the humidity W detected by step 503a. In case both the vehicle speed V and the humidity W are constant, a boundary line 601 where the vehicle wheel spins is obtained by the steering angle and the throttle position as shown in the table illustrating the vehicle spin region in FIG. 10. In case both the steering angle and the throttle position exceed the boundary line 601, that is, the pointer determined by the vehicle speed V and the road surface humidity W is in the biased region 602 which is upper right to the boundary line 601, the wheel is judged to be possible to spin. Since the above boundary line is variable responsive to the vehicle speed V and the road surface humidity W, it reaches to 0 in the table as the vehicle speed V and the road surface humidity W, water screen formed on the road surface, increase as the line 603 shows. In case the vehicle spin is judged to be possible by the present step, the routines of the following steps 506 and 607 are jumped to terminate the preset routine. In case of the steering angle H2 is less than 90° at the step 504 or the throttle position S2 is less than half of full throttle position at step 505, or the vehicle spin is judged not to be possible to occur at step 505a, the program proceeds to the step 506 wherein the program is executed to proceed step 507, and then terminate the present routine.

The controller for automatic transmission in the second embodiment detects the possibility of the vehicle spin responsive to the vehicle speed V and the road surface humidity W, in case both the steering angle and throttle position are more than 90° and half ($\frac{1}{2}$) of full throttle position, respectively, avoiding the routine of the shift change. Therefore the present embodiment also has an effect as providing stable running during cornering as well as the first embodiment. The present embodiment detects the possibility of the vehicle spin responsive to the vehicle speed V and the road surface humidity W, which enables vehicles to corner and accelerate with no fear in spite of running with exceeding normal vehicle speed V or running on the slippery road due to rain or the like. Next, the third and the fourth embodiments are described and the following release means is added to the above first and second embodiments.

The release means has functions of both releasing the hold of the shift down in automatic transmission and judging whether the release means is operated.

The above judging function judges whether or not the order of shift down is inhibited by the inhibit means M6 (condition 1), the vehicle acceleration detected by the acceleration detection means M5 is a preset value or more (condition 2), the cornering degree detected by the cornering detection means M4 and the cornering speed calculated by a cornering speed calculation means are less than the preset values (condition 3), and the detected vehicle acceleration increases from when the order of shift down is inhibited by the inhibit means M6 (condition 4). The release function is effective in the following conditions:

(1) The detected vehicle acceleration is less than the preset value when the order of shift down is inhibited.

(2) The order of shift down is inhibited, both the detected cornering degree and speed are less than preset values, respectively, and the detected vehicle acceleration increases from when the order of shift down is inhibited. The above preset values are variables with no reciprocal relation. For detecting the vehicle accelerations both in the conditions of 2 and 4, the same sensor is not necessarily used, instead, the respective condition of 2 and 4 may be assumed to be actual vehicle acceleration and displacement degree of the accelerator pedal, respectively so as to sense whether or not the driver intends to accelerate.

The release means generates a release signal to erase the inhibit signal from the inhibit means M6, which releases inhibition of the order of the shift down.

In the above-constructed controller for automatic transmission, the inhibit means M6 avoids the abrupt generation of too much driving force by ordering the order means to prevent the gear change means from automatically operating shift down, even though the inhibit means M6 judges the occurrence of the vehicle spin in case both the cornering degree detected by the cornering detection means M4 and the acceleration detected by the acceleration detection means M5 are preset values or more, whereby the occurrence of the wheel spin is avoided without deteriorating the limitation of the cornering force for safe running. In case the acceleration is below the preset value or less after the operation of the inhibit means M6, hold of the shift down by the inhibit means M6 is released, so that the required speed is obtained by automatic gear changing. In case the cornering is slow down after the acceleration and cornering of the inhibit means M6, shift down is not immediately operated just after the degree of cornering being small, but operated only when more acceleration is needed to be increased.

Thus, neither shift down after cornering nor the repetition of shifting and holding the gear, in case of running in S-shaped course, are not necessary, resulting to prevent the driver from suffering uncomfortable feeling with sudden halting caused by the above operations. The detection of displacement degree of the accelerator pedal to detect the increase in the above acceleration allows to sense whether the driver intends to accelerate, resulting to avoid the abrupt shift down.

The third embodiment is described hereinafter. The third embodiment is similar to the first one except for the following addition of initial setting step 300, steps 306 and 307, and FIG. 12 for operating release means.

Figure 11:
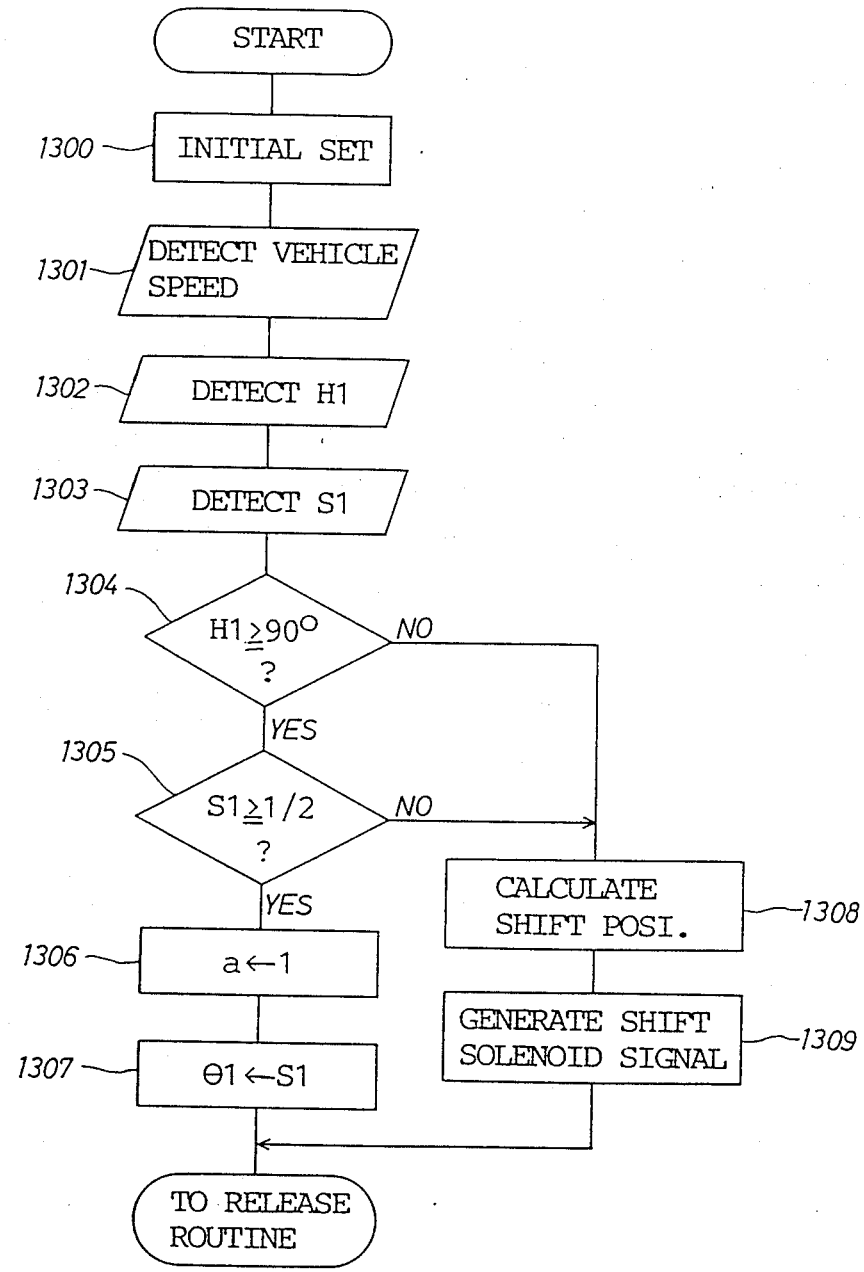
FIG. 11 is a flow chart illustrating control for automatic transmission in the third embodiment.

A flow chart illustrating the routine of inhibition of automatic transmission in FIG. 11 is described. The routine is executed with interruption to the CPU 201 at the present time interval during vehicle running.

On starting the preset routine, a step 1300 is executed wherein the routine is initially set, and at least a bit "a" is executed zero-clear as described later. The explanation of following steps of 1301, 1305, 1308 and 1309 are omitted since they are similar to those of the first embodiment. In case the throttle position S1 is judged to be above half ($\frac{1}{2}$) of full throttle position or more at step 1305, the routine proceeds to step 1306 wherein bit "a" is set to 1. The "a" functions as a flag which judges whether or not the program of release means is to be executed, which is described later in detail. The program proceeds to step 1307 wherein the throttle position detected at step 1302 is set to $\theta$1. Terminating the routine of the step 1307 brings an end to the program. In both cases that the steering angle H1 is judged to be less than 90° at step 1304, and the throttle position S1 is judged to be less than half ($\frac{1}{2}$) of full throttle position, the program proceeds to step 1308. After executing steps 1308 and 1309, the program is terminated. Therefore, the inhibit means is executed by jumping the steps of both 1308 and 1309.

Figure 12:
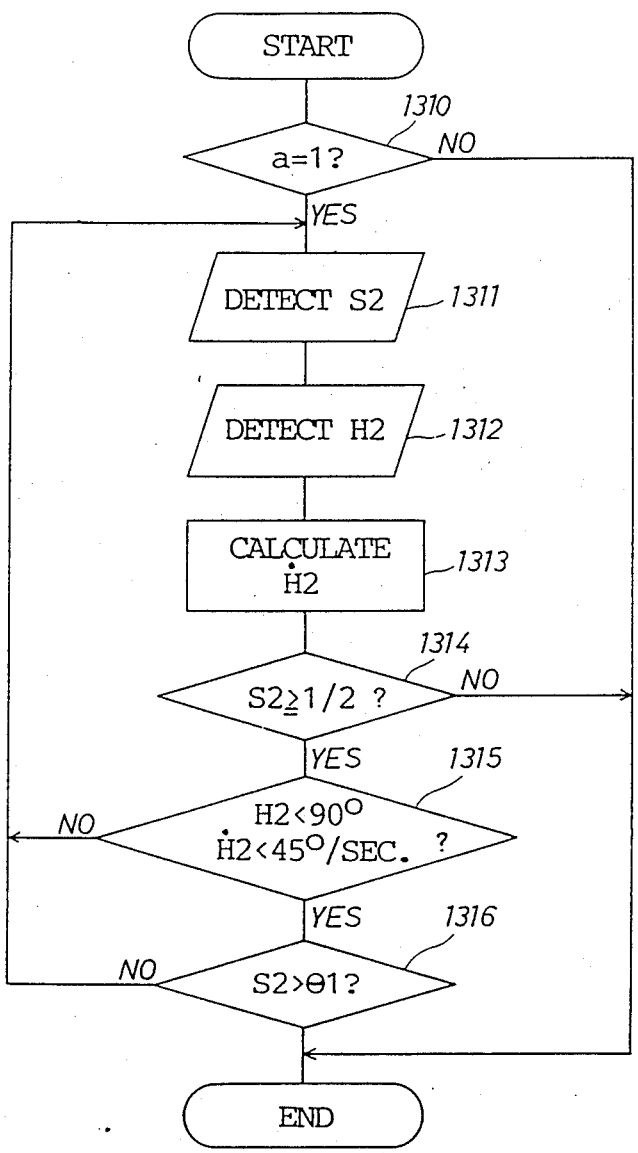
FIG. 12 is a flow chart illustrating releasing the inhibition of automatic transmission in the third embodiment.

When terminating the inhibit routine of the automatic transmission as shown in a flow chart of the above FIG. 11, release routine of the automatic transmission is executed as shown in the flow chart of FIG. 12.

On starting the present routine, step 1310 is executed wherein the "a" is judged whether it is 1. The "a" has a value 1 in step 1306 of FIG. 11 as a flag showing whether or not the routine of the inhibit means is executed. In case the "a" is judged to be 1 in step 1310, the program proceeds to step 1311. In case the "a" is not 1, the program terminates without executing the routine.

The program further proceeds to the step 1311 wherein the throttle position S1 is detected by the routine similar to that of step 1303 in FIG. 11. The following step 1313 calculates time change ratio $\dot{H}2$ of the steering angle $\dot{H}2$ detected at step 1312.

The program proceeds to step 1314 wherein the throttle position S1 detected at step 1311 is judged whether it is more than half ($\frac{1}{2}$) of full throttle position. In case the throttle position S1 is judged to be less than half ($\frac{1}{2}$) of full throttle position at the step 1314, the program terminates. In case the throttle position S1 is judged to be above half ($\frac{1}{2}$) or more of full throttle position in the step 1314, the program proceeds to step 1315. The step 1315 judges whether or not both the steering angle $\dot{H}2$ detected at step 1312 and time change ratio $\dot{H}2$ calculated in the step 1313 are less than 90° and 45°/sec., respectively. In case $\dot{H}2$ is judged to be above 90° or more or/and $\dot{H}2$ is judged to be 45°/sec. or more in the step 1315, the program returns to the step 1311 to execute following routines repeatedly. In case H2 and $\dot{H}2$ are less than 90° and 45°/sec., respectively, the program proceeds to step 1316 wherein the throttle position S2 detected at step 1311 is judged whether it is more than 1 set at the step 1307 of FIG. 6. In case the throttle position S2 is judged to be $\theta$1 or less the program returns to the step 1311 to execute following routines repeatedly. In case the throttle position S2 is judged to be more than $\theta$1, the program terminates.

The controller for automatic transmission of the present embodiment operates holding to avoid shift changing by executing the inhibit procedure shown in FIG. 11 in case both the steering angle and displacement degree of the throttle position are more than 90° and half ($\frac{1}{2}$), respectively. By executing the routine as shown in a flow chart of FIG. 12, aforementioned hold is released in the following conditions:

(1) The throttle opening S2 is below half ($\frac{1}{2}$); and (2) The steering angle $\dot{H}2$ and time change ratio of the steering angle $\dot{H}2$ and the time change ratio $\dot{H}2$ are below 90° and 45°/sec., respectively and the increase of the acceleration is more than that of the vehicle in which the shift down order is inhibited.

While in case the above conditions are not met, hold of the shift down is kept by the repetition of program from the step 1311 through 1316, which provides stable running without applying too much driving force during cornering nor deteriorating the limitation of the cornering force. Conventional passenger cars, in particular, can easily corner and accelerate on the conventional roads with normal speed. This system also provides the driver comfortable feel and safe running because even when the steering wheel is loosened after cornering, too much driving force would not be generated.

The fourth embodiment of the invention is hereinafter described.

The fourth embodiment includes the addition of the initial set steps 1500, 1506 and 1507, respectively corresponding to the steps 1300, 1306 and 1307 in the third embodiment, to the control flow chart of the second embodiment.

Figure 13A:
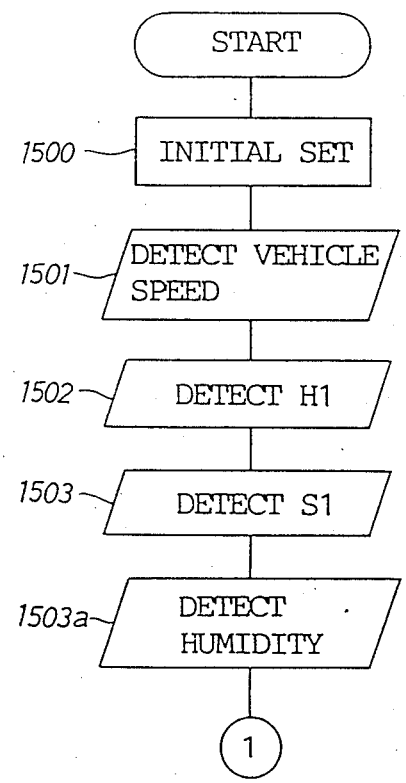
FIGS. 13A and 13B are flow charts illustrating inhibition of automatic transmission in the fourth embodiment.
Figure 13B:
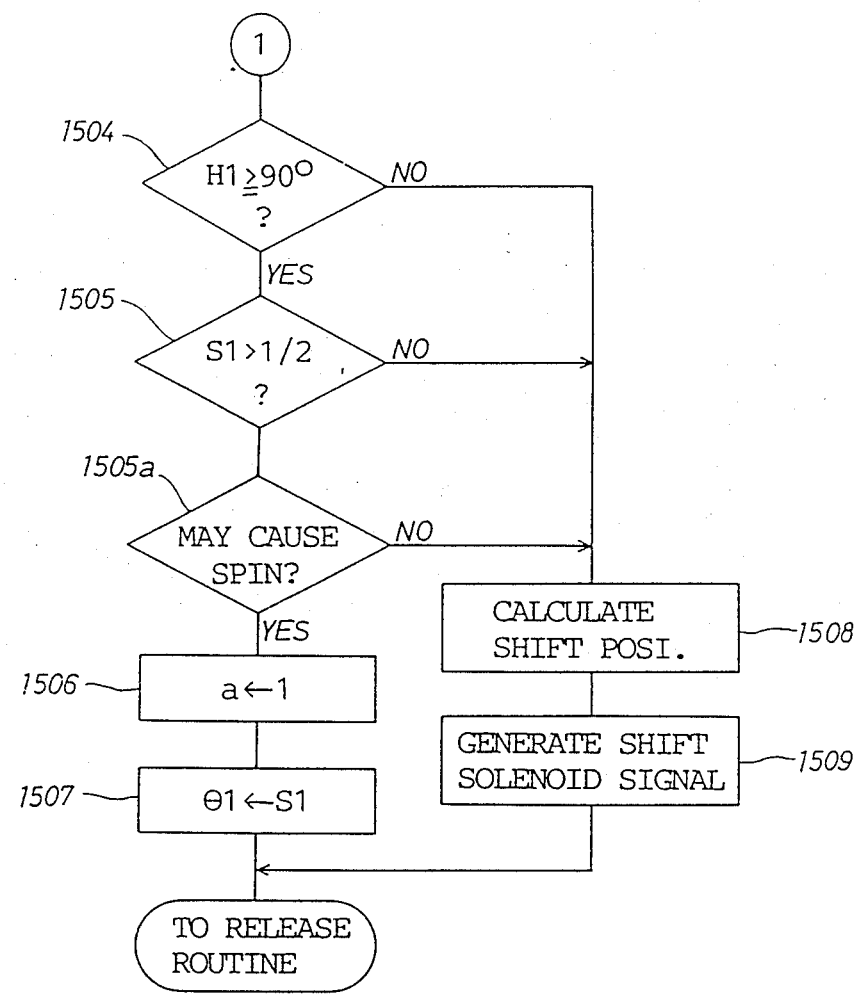

Terminating the inhibit routine of the automatic transmission as shown in the flow chart of FIG. 13, the release routine is executed by the CPU. Since the release procedure is similar to what is illustrated in FIG. 12 of the third embodiment, the explanation is omitted. As described above, in case both a steering angle and a displacemnt degree of the throttle position are more than 90° and half ($\frac{1}{2}$) of full throttle position, respectively, the controller for automatic transmission of the fourth embodiment detects the possibility of vehicle spin responsive to the vehicle speed V and the road surface humidity W to hold the operation of shift change only when the possibility of the vehicle spin is detected. The above embodiment has such a superior effect for providing safe cornering and accelerating during running with excessive speed on the slippery road in the rain, the possibility of vehicle spin is detected responsive to a vehicle speed V and the road surface humidity W. In aforementioned third embodiment, the preset values of judgment in throttle position during inhibit and release procedures are set to be half ($\frac{1}{2}$) (step 1314 in FIG. 12), the two values have no relation, resulting in different values. Since 90° at step 1304 of FIG. 11 and at step 1315 of FIG. 13 have no relation, they are made of different values. As for the aforementioned conditions, they are similar to those of the third embodiment as well as those of the fourth embodiment.

The first, second, third and fourth embodiments employ the steering angle sensor as a cornering detection means for detecting steering angle, however, anything which detects vehicle cornering is available, for example, application of a left and right coupled driving sensors for detecting respective rotational speed in both follower wheels to obtain the cornering degree from the difference of the rotation speed between the follower wheels. The rolling of the vehicle body due to the cornering is detected, for example, by the vehicle height sensor for detecting space between suspension arm and vehicle body or the sensor for detecting helix angle of stabilizer. The vehicle inertia in yawing direction due to cornering is detected by a gyrometer.

A sensor for detecting displacement degree of the accelerator pedal is used as an acceleration detection means instead of a throttle sensor. A sensor for detecting rotational speed of the vehicle wheel is used to obtain change ratio of the rotational speed to the preset time. The difference between displacements of front and rear suspension by the vehicle height sensor for detecting space between the suspension arm and the vehicle body. The inertia in yawing direction can be detected by a gyrometer or the like.

Therefore, the present invention in various ways as far as they do not deviate from the gist of the invention defined in the following claims.

What is claimed is:

1. Controller for automatic transmission comprising:
a sensor for detecting a vehicle operating condition;
a transmission for transmitting driving power to wheels;
ordering means for ordering a shift change of said transmission to drive said transmission based on the detected operating condition;
cornering detection means for detecting a degree of vehicle cornering;
throttle opening degree detection means for detecting a degree of throttle opening;
inhibiting means for inhibiting a shift down order of said transmission when said detected vehicle cornering degree and said detected throttle opening degree are above first and second preset values, respectively;
wherein said controller further comprises first release means for releasing inhibition of said shift down order when said detected degree of throttle opening is below the second preset value during inhibition of said shift down order.

2. Controller for automatic transmission comprising:
a sensor for detecting a vehicle operating condition;
a transmission for transmitting driving power to wheels;
ordering means for ordering a shift change of said transmission to drive said transmission based on the detected operating condition;
cornering detection means for detecting a degree of vehicle cornering;
throttle opening degree detection means for detecting a degree of throttle opening;
inhibiting means for inhibiting a shift down order of said transmission when said detected vehicle cornering degree and said detected throttle opening degree are above first and second preset values, respectively; and
second release means for releasing said inhibition of said shift down order when said detected vehicle cornering degree and a cornering speed responsive thereto are below third and fourth preset values, respectively, and when the detected throttle opening degree increases more than the throttle opening degree sufficient to generate the inhibition of the shift down order.

3. Controller for automatic transmission comprising:
a sensor for detecting a vehicle operating condition;
a transmission for transmitting driving power to wheels;
ordering means for ordering a shift change of said transmission to drive said transmission based on the detected operating condition;
cornering detection means for detecting a degree of vehicle cornering;
throttle opening degree detection means for detecting a degree of throttle opening;
inhibiting means for inhibiting a shift down order of said transmission when said detected vehicle cornering degree and said detected throttle opening degree are above first and second preset values, respectively;
vehicle spin determination means for determining whether or not the vehicle spins, based on a table determined by the throttle opening degree and cornering degree in response to a vehicle speed and a road surface humidity, and
second inhibiting means for inhibiting the shift down order when said determination means determines that the vehicle is spinning.

4. A controller for an automatic transmission comprising:
a sensor for detecting a vehicle operating condition;

a transmission for transmitting driving power to wheels;

ordering means for ordering a shift change of said transmission to drive said transmission based on the detected operating condition;

cornering detection means for detecting a degree of vehicle cornering;

throttle opening detection means for detecting the degree of throttle opening;

inhibiting means for inhibiting a shift down order of said transmission when said detected vehicle cornering degree and said detected throttle opening degree are above first and second preset values, respectively;

first release means for releasing inhibition of said shift down order when said detected degree of throttle opening is below the second preset value during inhibition of said shift down order; and second release means for releasing said inhibition of said shift down order when said detected vehicle cornering degree and a cornering speed responsive thereto are below third and fourth preset values, respectively, and when the detected throttle opening degree increases more than the throttle opening degree sufficient to generate the inhibition of the shift down order.

5. Controller for automatic transmission as claimed in claim 4, wherein a steering angle represents the cornering degree of said vehicle.

6. Controller for automatic transmission as claimed in claim 4, wherein a difference between right and left follower wheel speeds represents the cornering degree of said vehicle.

7. Controller for automatic transmission as claimed in claim 4, wherein a differential value of a steering angle represents the cornering degree of said vehicle.

8. Controller for automatic transmission as claimed in claim 4, wherein a vehicle height between a vehicle body and a suspension arm represents the cornering degree.

9. Controller for automatic transmission as claimed in claim 4, wherein a torsional angle of stabilizer represents the cornerng degree.

10. Controller for automatic transmission as claimed in claim 4, wherein an inertia in yawing direction in the vehicle represents the cornering degree.

* * * * *